United States Patent [19]

Mort et al.

[11] 4,152,818

[45] May 8, 1979

[54] MAKING MECHANICAL TUBE JOINTS

[75] Inventors: Charles B. Mort, Findlay; Robert E. Anthony, Mount Blanchard, both of Ohio

[73] Assignee: United Aircraft Products, Inc., Dayton, Ohio

[21] Appl. No.: 815,582

[22] Filed: Jul. 14, 1977

[51] Int. Cl.² .............................................. B23P 15/26
[52] U.S. Cl. ............................ 29/157.3 C; 285/382.2; 285/382.4; 29/157.4; 29/523
[58] Field of Search ............... 29/157.3 C, 157.4, 523; 285/382.2, 382.4

[56] References Cited

U.S. PATENT DOCUMENTS

| 822,475 | 6/1906 | Price | 285/382.4 X |
|---|---|---|---|
| 1,102,163 | 6/1914 | Opperod | 29/523 |
| 1,363,208 | 12/1920 | Serck | 29/157.4 |
| 2,092,358 | 9/1937 | Robertson | 285/382.4 X |
| 2,355,852 | 8/1944 | Fisher | 29/157.4 |
| 3,156,042 | 11/1964 | Reed | 29/523 |
| 3,370,870 | 2/1968 | Mahoff | 29/523 |
| 3,934,325 | 1/1976 | Jaffe | 29/523 |

FOREIGN PATENT DOCUMENTS

| 2557628 | 7/1977 | Fed. Rep. of Germany | 285/382.4 |
| 191860 | 10/1964 | Sweden | 285/382.2 |

Primary Examiner—C. W. Lanham
Assistant Examiner—V. K. Rising
Attorney, Agent, or Firm—J. E. Beringer

[57] ABSTRACT

A method of making mechanical tube joints in which first and second metal working operations, applied through a ferrule installed in a tube end in a header plate, effect initially a tight fit of the tube end in the plate followed by a sealing contact. The method proposes a machine operation in which multiple header plates, each providing multiple tube positions, are supported for indexing movements relative to a bank of tools for performing the second of the first and second metal working functions, complete sealed joints of all tube positions in all plates being effected in a single series of automatic operations.

13 Claims, 8 Drawing Figures

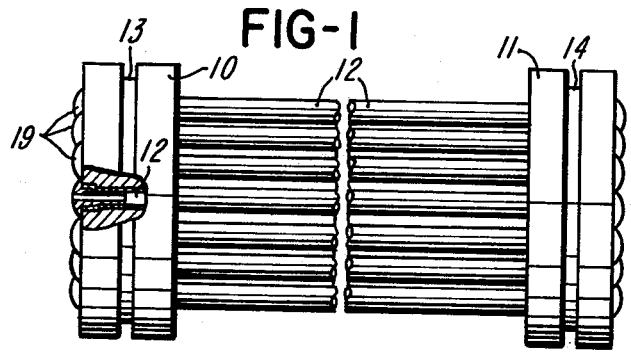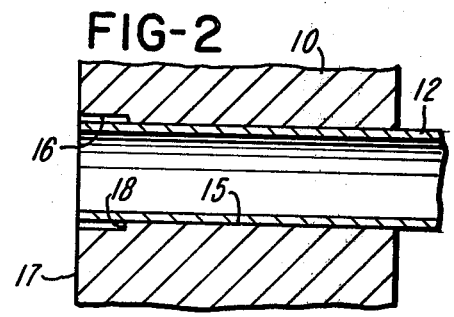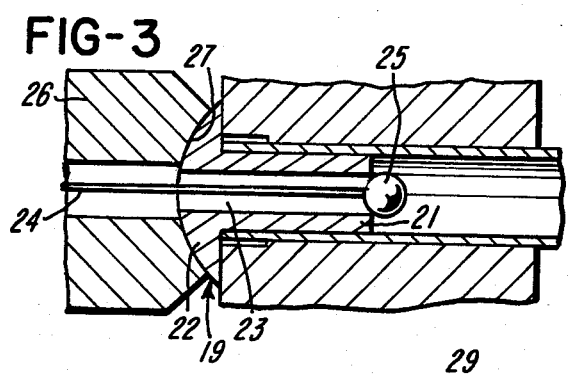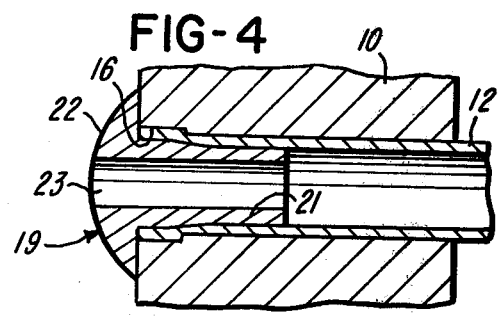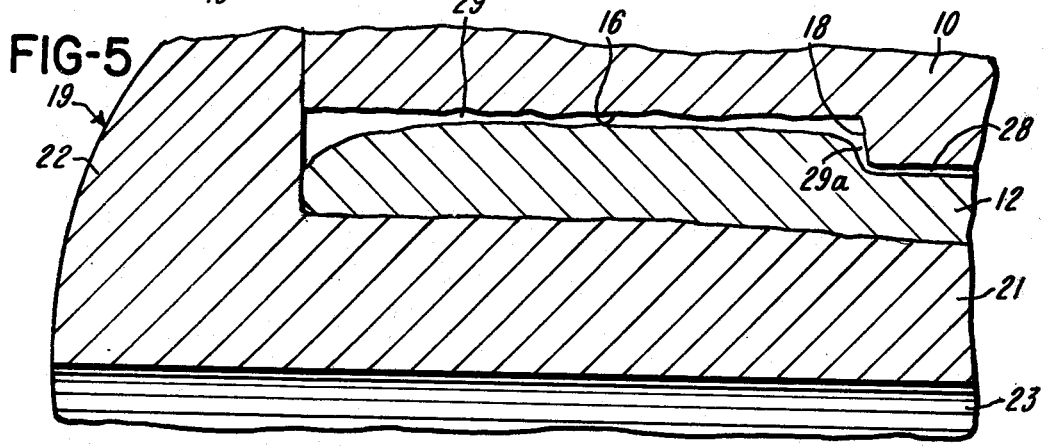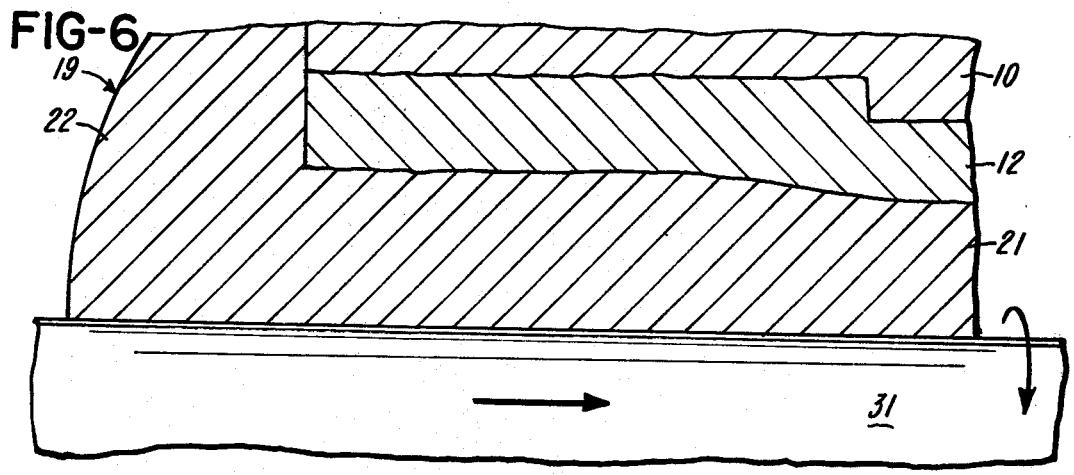

MAKING MECHANICAL TUBE JOINTS

BACKGROUND OF THE INVENTION

In the art of fabricating tube and shell heat exchangers it has been known to create a joint between a tube end and its accommodating tube sheet or header plate by expanding the tube out into close fitting contact with the wall of a hole in which the tube end is received. This is frequently done by inserting into the tube end, after it has first been inserted in a hole in the header plate, a rotatable mandrel carrying rollers. In response to longitudinal penetration of the mandrel, and its simultaneous rotation, the tube end is radially deformed into close fitting contact with the hole wall.

In that area of the heat exchanger art which has seen development of the light weight, compact, high performance tubular heat exchanger, the use of mechanical tube joints has been abandoned in favor of metallurgical bonding, particularly brazing. In this process, one or both faces of the header plate is coated with braze alloy. After tubes have been installed in holes provided in the header plate or plates, the resulting assembly is heated to the melting temperature of the braze alloy and then allowed to cool. In the course of these steps, the braze alloy melts, flows to form fillets around the tubes, and, in hardening, forms a bond and a seal between the tubes and plate. Metallurgical bonding provides obvious benefits, including speed, uniformity and low cost, and is further valued for the positive seal it forms at the tube joints. In many compact, high performance heat exchangers, even minor leaks through the tube joints cannot be tolerated.

The brazed heat exchanger is not without disadvantages. Under some conditions of manufacture or of use, or of both, corrosion can become a problem. Very high pressures of circulated fluids, coupled with vibration and shock loading, can be destructive of tube joints. These considerations have led in some instances to demand for a non-brazed tubular heat exchanger, that is, a heat exchanger in which the tubes are joined to the header plates using only mechanical means. In attempting to comply with this demand, however, it has been discovered that conventional techniques of the past are inapplicable. Thus, among the steps taken to achieve light weight, high performance and compactness in tubular heat exchangers are steps to make the tubes of small diameter, on the order of one-eighth inch, to make the tubes of thin wall material, and to pack the tubes closely together for high density. These features increase the difficulties and risk involved in expanding tube ends into the header plate. The small diameter of the tubes rules out ordinary expansion techniques since no known expansion tool in the art is small enough to penetrate and work the tube interior.

It has accordingly been necessary to turn to innovative tools and practices in the effort to develop a practical method of mechanically joining tubes in header plates. In one such proposal, a rivet-like device or ferrule is placed on a slim, wire-like mandrel to limit against an enlarged head on the mandrel. The mandrel with mounted ferrule combination is inserted into a tube end in a header plate. A pneumatic gun or the like then pulls on the mandrel while applying an endwise reactant thrust to the ferrule. The result is to draw the enlarged head on the mandrel through the ferrule, expanding it and expanding also the surrounding tube end. This operation has been exhaustively tested, using many variations of tube, mandrel and ferrule size and materials, with and without a technique of counterboring the header plate to provide a space into which the tube end may expand. Even under controlled, laboratory conditions it has not been possible, using the foregoing method, to produce a leak free heat exchanger.

The foregoing discussion embodies a disclosure of all of the prior art of which we are aware, material to the question of patentability of the invention, and is intended as compliance with revised Section 1.97 of Title 37 of the Code Of Federal Regulations.

SUMMARY OF THE INVENTION

In accordance with the present invention, the above proposal for expanding a tube end through an installed ferrule is retained, amplified and added to. Thus, the header plate is bored and counterbored and ferrules, which have a length greater than the depth of the counterbores, are installed in the bores to project through the counterbores and have head portions limiting against a front face of the header plate. The ferrule is then expanded in accordance with the prior suggestion, and, in a second metal working operation, a burnishing type tool is rotated and thrust longitudinally within the ferrule. The longitudinal motion of the rotating tool is continued through and beyond that portion of the ferrule surrounded by the counterbore, and, preferably, throughout the full length of the ferrule. In cutting apart sample joints, and subjecting them to microphotographic inspection, it has been discovered that the initial expansion of the ferrule is insufficient to obtain close intimate contact of the tube with the header plate and that there is in particular inadequate deformation of the tube at the shoulder defining the bottom of the counterbore. Following the second metal working operation, however, the tube material was found to have been effectively indented by the counterbore shoulder and to have substantially filled the counterbore. Tests reveal the combination of the first and second metal working steps to deny leaks around the tubes, and that the concept of performing the second operation throughout the full length of the ferrule to be particularly effective in positively precluding leaks.

The reasons why the amplified and enlarged upon method of the present invention succeeded while the prior method did not are not fully known. Contributing factors are, however, thought to be the reverse working of the ferrule by the relatively opposed drawing and thrusting of the respective first and second metal working operations, the use of a relatively sharp edged counterbore shoulder and of a counterbore of lesser length than the ferrule, and the thrusting of the burnishing tool completely through the length of the ferrule.

The described second metal working operation is carried out, in a preferred practice of the invention, using automated apparatus. A plurality of header plates is given common mounting in a table adapted for rotary step by step motion, peripheral portions of the plates being inherently supported. In an overhead or opposing relation, a bank of rotatable burnishing tools is mounted in a machine head adapted to move reciprocably toward and from the table. In a relative approaching motion of the tools, they are caused to enter ferrules installed in presented tube ends and effect the second of the described first and second metal working operations. In a retracting motion of the tools, the apparatus table is stepped in a rotary sense to bring new tube positions to alignment with opposing tools, and, in a predetermined series of stepping or indexing movements all tube positions in all header plates are worked by the reciprocating and spinning tools.

An object of the invention is to provide a method of making a mechanical tube joint substantially in accordance with the foregoing discussion.

Other objects and details of the invention method will appear more clearly from the following description, when read in connection with the accompanying drawings, wherein:

FIG. 1 is a view in side elevation of a tubular heat exchanger core, comprised of header plates and tubes mounted therein, a portion of one of the plates being broken away to show a tube joint;

FIG. 2 is a detail view, enlarged with respect to FIG. 1, showing a fragment of a header plate and an end of a tube installed therein prior to being expanded to form the tube joint;

FIG. 3 is a view similar to FIG. 2, showing a ferrule installed in the tube end and a mandrel inserted in the ferrule preparatory to effecting the first of first and second metal working operations;

FIG. 4 is a view like FIGS. 2 and 3, showing the tube joint as it appears after the first metal working operation;

FIG. 5 is a greatly enlarged view of a fragment of FIG. 4, showing gaps remaining in the tube joint following the first of the first and second metal working operations;

FIG. 6 is a view like FIG. 5, showing the ferrule and tube being expanded during the second of the first and second metal working operations;

Figure 7:
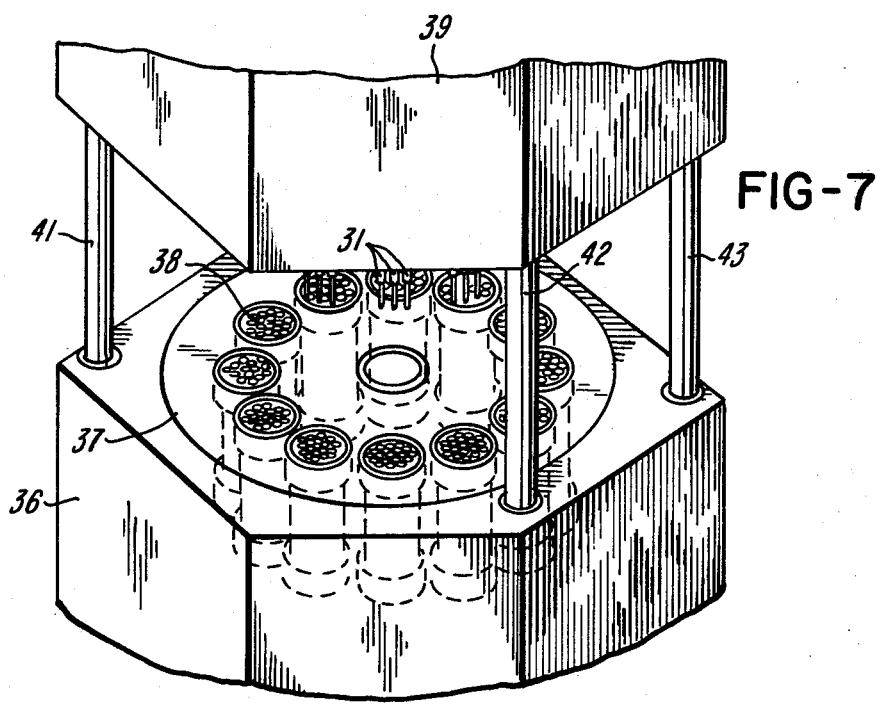
FIG. 7 is a view of apparatus provided for use in carrying out the second of the first and second metal working operations.

Referring to the drawings, the invention has particular although not limited utility in the making of a tubular heat exchanger core as illustrated in FIG. 1. The core comprises spaced apart header plates 10 and 11 interconnected by tubes 12. The core assembly comprising plates 10 and 11 and tubes 12 will in a conventional use of such an assembly position within a surrounding shell and have one or both ends joined to a manifold structure. The header plates have respective exterior grooves 13 and 14 in which a sealing ring or the like is mounted. A first fluid is confined by the surrounding shell and flows over and between the tubes 12. A second fluid has access through the manifold structure to an end face of one of the plates 10 or 11 and flows longitudinally through the tubes 12 to discharge at opposite ends thereof. The arrangement is one to effect a transfer of heat between the first and second fluids through the walls of tubes 12. Sealing devices installed in the grooves 13 and 14 prevent intercommunication of the first and second fluids around the header plates. Mechanical, leak free joints where the tubes are received within the header plates prevent an intercommunication of the first and second fluids around the tube ends.

The header plates 10 and 11 are substantially identical so that a description of one will suffice for both. Similarly, the manner of effecting a tight, sealed joint between each tube end and a respective plate is the same for all of the tubes 12 so that a description of one will suffice for all. Thus, the plate 10 has a through bore 15 receiving a respective tube 12. At one end of the bore 15 is a counterbore 16 opening through an outer end face 17 of the header plate. The tube 12 is made of a metallic material having sufficient rigidity to cooperate with other tubes and with the header plates 10 and 11 in defining a relatively stationary arrangement of parts comprising the core assembly. The tube is relatively thin for good heat transfer properties and is deformable in the sense that portions thereof within the header plate may be expanded into close fitting contact with walls defining bore 15 and counterbore 16, as will be seen. In its outside diameter, the tube 12 is approximately equal to the diameter of bore 15. The tube 12 is inserted into the bore 15 in an appropriate manner, as by a hand or machine operation, and is allowed to assume a position therein substantially as indicated in FIG. 2 where one end of the tube positions substantially in the plane of face 17. The tube extremity accordingly projects through counterbore 16 and is in a radially spaced relation to the cylindrical wall surface defining the counterbore. The bottom of the counterbore defines a shoulder 18 and the manner of forming the counterbore is such as to cause the shoulder 18 to be a sharp edged surface perpendicular to the outer surface of the tube 12. In this connection, the bore 15 may be formed in any convenient manner, as by drilling. Counterbore 16 may be formed separately from or in conjunction with the forming of bore 15, as by means of a shouldered drill tool forming the counterbore as a part of the same operation by which bore 15 is formed.

In a step following insertion of the tube 12 in the header plate, a tubular rivet or ferrule 19 is inserted in that end of the tube opening through plate surface 17. The ferrule 19 includes a cylindrical body or shank portion 21 adapted to be received within the tube and a head portion 22 adapted to limit against face 17. Body portion 21 of the ferrule has an outside diameter which approximately equals the inside diameter of tube 12. The ferrule has a central bore opening through body 21 at what may be regarded as an inner end thereof and opens through head 22. The ferrule 19 is made of a relatively rigid yet deformable material, in accordance with its function in assisting in deforming the tube 12. The ferrule is inserted in the tube end as a part of an assembly further including a wire-like mandrel 24 to one end of which is fixed a generally spherical member 25 having a diameter somewhat greater than the diameter of bore 23. The mandrel 24 is received at an opposite end in a pneumatic gun, a nose portion 26 of which is shown in FIG. 3 hereof. Nose portion 26 has an end cavity 27 adapted to receive ferrule head 22. Within the gun 26, mandrel 24 has a detachable connection with a pulling mechanism which when energized exerts an axial pulling motion upon the mandrel. Prior to the mandrel being engaged with pulling mechanism within the gun 26, a ferrule 19 is slipped over the mandrel and allowed to assume a position of rest in engagement with the enlarged spherical member 25 defining the mandrel extremity. The mandrel is then engaged with pulling mechanism in the gun and nose portion 26 is brought to a position to seat against ferrule head 22. The parts at this time assume a relationship to one another substantially as illustrated in FIG. 3. As will be seen therein, the shank or cylindrical portion 21 of the ferrule 19 appreciably exceeds in length the depth of counterbore 16. If pneumatic gun 26 now is energized to exert a pull on mandrel 24, the enlarged, spherical end member 25 on the mandrel will be drawn through bore 23, the reaction of this applied force being sustained by the interengagement of gun nose portion 26 and ferrule head 22. In the process of moving through bore 23, the spherical member 25 displaces material defining the wall of the bore in a generally radial sense. Deforming pressures thus applied are transmitted through the shank body 21 of the ferrule to the tube 12 where they result in the tube being crowded into a close fitting contact with the wall of plate bore 15. As the member 25 passes through a plane coincident with shoulder 18, tube material is deformed into the counterbore 16, and, as the member 25 is drawn completely through and out of the bore 83, the tube expands substantially to fill the counterbore 16. The parts are at this time substantially in a position as illustrated in FIG. 4 wherein the ferrule 19 is effectively installed in a tube 12, and, in expanding, has deformed the tube into a relatively tight fit in the bore 15 and in counterbore 16.

The foregoing constitutes a first metal working step, in accordance with the present invention. If the parts, as formed by the first metal working operation, are subjected to inspection by a microphotographic process, or the like, it will be found that the deforming of the tube 12 outwardly into contact with the bore 15 and outwardly into contact with the wall defining counterbore 16 has not effected a sealing interengagement of the parts. The relationship of the parts may, for example, be that illustrated in FIG. 5 which is a magnification of a portion of the joint as seen in FIG. 4. As there indicated, whereas it would appear to normal inspection that the tube 12 is in a uniformly contacting relation to the wall of bore 15 and fills counterbore 16, there actually is a lack of uniformity in contact in these areas resulting in gaps 28 between the tube and plate and in gaps 29 within the counterbore, particularly a gap 29a at shoulder 18. The occurring gaps provide a leak path around the tubes 12 and resulting leaks may be of minor or major proportions according to the kind and pressure of the fluid confined between header plates 10 and 11 and in accordance with variations in the tolerances to which the parts have been made.

Figure 8:
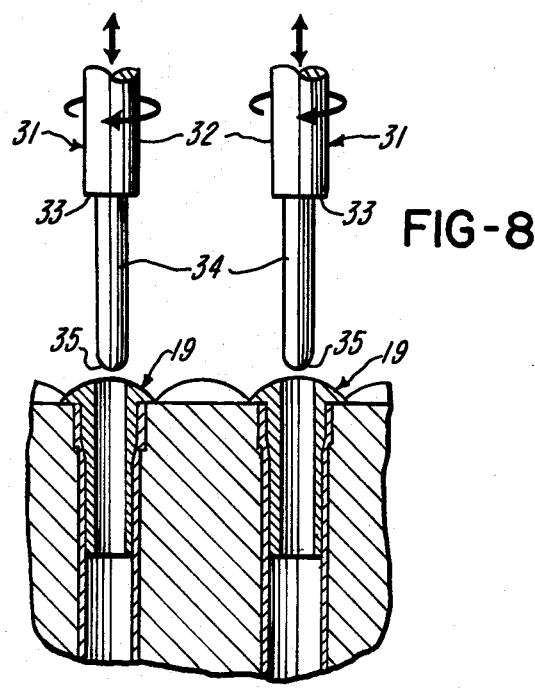
FIG. 8 is a detail view showing the relationship of parts in the apparatus of FIG. 7.

A second metal working operation as proposed by the present invention involves the use of a burnishing type tool 31 (see FIGS. 6 and 8). This tool has a body portion 32 terminating at an outer end in a shoulder 33 from which projects a relatively reduced diameter cylindrical portion 34, the latter terminating in a blunt, curved extremity 35. Cylindrical portion 34 has a diameter somewhat exceeding the internal diameter of ferrule 19 as expanded by spherical member 25. The tool 31 is inserted into the ferrule 19 through the outer or head end thereof and is thrust longitudinally through the ferrule while at the same time being relatively rapidly rotated. The combination of axial thrust and rotary movement causes the cylindrical portion 34 of the tool to penetrate bore 23 and to effect a further displacement of ferrule material radially outwardly. Additional deforming pressure accordingly is applied to tube 12, forcing the tube tightly into counterbore 16 and expanding all affected parts of the tube beyond the counterbore into uniform, intimately contacting relation with the wall defining bore 15. A relationship of parts substantially as illustrated in FIG. 6 is achieved and it will be noted that all gaps 28–29 have been closed, and, that in particular, relatively sharp edged shoulder 18 has become indented into the material of the tube 12 in a manner positively to close gap 29a. Axial thrust of the burnishing tool 31 is continued until the cylindrical portion 34 has passed to and through the full extent of ferrule bore 23. Upon the tool being then retracted, the parts will be found to have assumed the relationship noted in FIG. 6 wherein a positive seal has been established against the escape around the tube 12 of fluid confined between the header plates 10 and 11.

It is particularly to be noted in connection with the second metal working step that burnishing-like tool 31 moves through ferrule bore 23 in a direction opposite to that from which sperical member 25 is moved, and that the member 31 is thrust through the ferrule 19 until the full length thereof has been penetrated. It is not fully understood why the combination of metal working steps here proposed succeeds in its intended purpose while a method consisting only of a single metal working step does not. It is believed, however, that the length of the ferrule 19, in relation to the depth of counterbore 16, contributes importantly to this result, as does the extent of penetration of the tool 31 and the relatively reverse movements of the mandrel 24–25 and the tool 31. It may be noted in this latter connection that deforming pressures applied by the respective tools include axial components which according to the present inventive concept are applied in a sense complementary to one another. It has been suggested that if a greater extent of deformation of the ferrule and tube is desired then the spherical member 25 could be made larger or the ferrule could be expanded in stages, using progressively larger spherical mandrels. There are limitations of strength in the wire-like member 24 which limit this practice, as well as cost factors making repeated operations impracticable. Moreover, neither recourse provides a reversely directed axial thrust as contemplated by the present second metal working operation and there is an inconsistency in the closing gaps 28–29 and particularly in the securing of a positive indented relationship between the tube and shoulder 18 of the counterbore.

The instant invention positively deforms the tube material in a two stage operation which, in conjunction with the provided counterbore, achieves a close sealing contact of the tube with the header plate.

In the case of a heat exchanger core comprised of multiple tubes 12, substantially as illustrated in FIG. 1, it will be understood that ferrules 19 are installed in all tube ends at both ends of the core assembly and the described first metal working operation carried out singly in connection with the several tubes. In this connection, the wire-like mandrel 24 may have multiple ferrules 19 thereon in an end to end series relation. The pneumatic gun may accordingly be moved quickly from one tube position to another, effecting successively the initial expansion of the several tubes. The second metal working operation may similarly be carried out with respect to individual tubes by mounting the burnishing-like tool 31 in a rotary power tool and applying it successively to the tube positions. In accordance with an aspect of the present invention, however, the second metal working operation is carried out in a machine capable of working simultaneously upon a plurality of core assemblies and completing work at the several tube positions of all thereof in a single series of operations.

As shown in FIG. 7, such a machine might include a base 36 supporting a relatively rotatable table 37 in which is a circular series of cavities 38. Each cavity 38 is a cylindrical recess in the table of a size to accommodate a core assembly therein and to present the encircling wall of the recess in a relatively closely confining relation to an uppermost header plate 10 or 11. Accordingly, the header plate is held against lateral deformation as a result of pressure supplied during the second metal working operation. In overhead relation to the base 36 of the machine is a head 39 reciprocable along guide posts 41, 42 and 43 in advancing and retracting motions relatively to the base. In rotary spindles, not here shown, the head 39 mounts multiple burnishing type tools 31. There is a pattern to the arrangement of tools 31 which places a predetermined number of tools in a predetermined relation to selected tube positions among the several core assemblies positioned in the table 37. The table 37 is rotated in step by step fashion in a timed relation to reciprocation of the head 39. Upon each descent of the head 39, the tools 31 enter ferrules 19 at aligning tube positions and effect the second of the first and second metal working operations as before described. Upon the tools being then retracted in an elevating motion of the head 39, the shank or working ends 34 of the tools are withdrawn from the core assemblies whereupon the table is moved to a next indexing position. The head 39 descends to effect a working of tubes at another selected group of tube positions and this series of operations continues until all tube positions in all core assemblies have been worked. It will be understood, in this connection, that the relative arrangement of tube positions and held tools 31 is such as to complete a working of all tube positions in all core assemblies during a predetermined number of indexing movements of the table 37.

It will be evident that the invention method lends itself to certain modifications within broad outlines of invention teachings. These and other modifications as may occur to persons skilled in the art having this invention disclosure before them are regarded as being within the scope of the claimed invention.

We claim:

1. A method of establishing by mechanical means a leak tight joint between a tube and shell type heat exchanger, including:
   a. providing a header plate with a through tube accommodating hole therein;
   b. providing a tube made of a deformable metallic material and having an outside diameter approximately the same as the hole diameter in the header plate;
   c. inserting an end of said tube into the hole in the header plate so that it is received therein with an extremity at or adjacent to an exterior face of said header plate;
   d. installing in an inserted tube end through said exterior face a metallic ferrule including a cylindrical body portion having an outside diameter approximately the same as the inside tube diameter and positioning said cylindrical body portion of said ferrule in said tube end in a longitudinal sense so that an outer end thereof substantially agrees with the extremity of said tube end; and
   e. in first and second metal working steps applied in axial thrusts directed reversely of one another effecting first an initial expansion of said ferrule to deform the surrounding tube end into close fitting contact with a header plate wall surface defining said through hole, and second a subsequent further expansion of said ferrule additionally to deform the tube end into sealing contact with said hole defining wall surface.

2. A method of establishing by mechanical means a leak tight joint between a tube end and an accommodating header plate in a tube and shell type heat exchanger, including:
   a. providing a header plate with a through tube accommodating hole therein;
   b. providing a tube made of a deformable metallic material and having an outside diameter approximately the same as the hole diameter in the header plate;
   c. inserting an end of said tube into the hole in the header plate so that it is received therein with an extremity at or adjacent to an exterior face of said header plate;
   d. installing in an inserted tube end through said exterior face a metallic ferrule including a cylindrical body portion having an outside diameter approximately the same as the inside tube diameter and positioning said cylindrical body portion of said ferrule in said tube end in a longitudinal sense so that an outer end thereof substantially agrees with the extremity of said tube end; and
   e. in first and second metal working steps effecting first an initial expansion of said ferrule to deform the surrounding tube end into close fitting contact with a header plate wall surface defining said through hole, and second a subsequent further expansion of said ferrule additionally to deform the tube end into sealing contact with said hole defining wall surface;
   f. said header plate having a counterbore coincident with said through hole and opening through said exterior face;
   g. the depth of said counterbore being less than the length of said ferrule;
   h. said tube end being deformed by said metal working steps into said counterbore.

3. A method as in claim 2, wherein:
   a. the first of said first and second metal working steps is carried out by drawing a mandrel with an enlarged head longitudinally through said ferrule from an inner end thereof to and through said outer end; and
   b. simultaneously applying to said ferrule an opposed reactant pressure.

4. A method as in claim 3, wherein:
   a. the second of said first and second metal working steps is effected by inserting a tool into said ferrule through the said outer end of said body portion thereof;
   b. causing said tool to penetrate said ferrule in a longitudinal motion toward the said inner end thereof while effecting a simultaneous rotary spin of the tool;
   c. the extent of longitudinal penetration of said ferrule by said tool being a distance greater than the depth of said counterbore; and
   d. said tool being a cylinder member with a rounded tip, the body of which has a diameter somewhat greater than the inside diameter of said ferrule as expanded by said first metal working step.

5. A method as in claim 4, wherein:
   a. penetrating movement from the outer end of the ferrule toward the inner end thereof is continued until the tool has projected through and beyond the inner end of the ferrule.

6. A method according to claim 3, wherein:
   a. said ferrule has an enlarged head on the said outer end of its said body portion;

b. said enlarged head limiting against said exterior face of said header plate.

7. A method as in claim 4, wherein:
a. said header plate has multiple tube accommodating holes;
b. tubes being assembled with tube ends received in all presented holes prior to installation and expansion of the ferrules therein.

8. A method as in claim 7, wherein:
a. multiple header plates with respect to the tube positions of each of which the first of said first and second metal working steps has been carried out are mounted to occupy a generally opposed relation to multiple tools for effecting the second of said first and second metal working steps;
b. rotating and alternately advancing and retracting said tools while rotating relatively to said header plates;
c. and effecting a unison rotary indexing motion of said header plates in a timed relation to the advance and retraction of said tools for a step by step completion of the second of said first and second metal working steps with respect to all said multiple header plates.

9. A method as in claim 8, wherein:
a. said multiple header plates have a common mounting in a rotary table; and
b. said table having recesses receiving and peripherally confining said header plates.

10. A method as in claim 1, wherein:
a. the first of said first and second metal working steps is carried out by drawing a mandrel with an enlarged head longitudinally through said ferrule from an inner end thereof to and through said outer end while simultaneously applying to said ferrule an opposed reactant pressure; and
b. the second of said first and second metal working steps being effected by inserting a tool into said ferrule through the said outer end of said body portion thereof, and causing said tool to penetrate said ferrule in a longitudinal motion toward the said inner end thereof while effecting a simultaneous rotary spin of the tool.

11. A method as in claim 10, wherein:
a. said header plate has a counterbore therein coincident with said through hole and opening through said exterior face;
b. the depth of said counterbore being less than the length of said ferrule;
c. said tube end being deformed by said metal working steps into said counterbore; and
d. the extent of longitudinal penetration of said ferrule by said tool being a distance greater than the depth of said counterbore.

12. A method as in claim 11, wherein:
a. penetrating movement by said tool from the outer end of the ferrule toward the inner end thereof is continued until the tool has projected through and beyond the inner end of the ferrule.

13. A method as in claim 10, wherein:
a. said header plate has multiple tube accommodating holes;
b. tubes being assembled with tube ends received in all presented holes prior to installation and expansion of the ferrules therein;
c. multiple header plates with respect to the tube positions of each of which the first of said first and second metal working steps has been carried out being mounted to occupy a generally opposed relation to multiple tools for effecting the second of said first and second metal working steps;
d. said tools being alternately advanced and retracted while rotating relatively to said header plates;
e. and a unison rotary indexing motion of said header plates occurring in a timed relation to the advance and retraction of said tools for a step by step completion of the second of said first and second metal working steps with respect to all said multiple header plates.

* * * * *